Jan. 20, 1959  A. J. KINDIG  2,869,712
CONVEYOR BELT IDLER
Filed Sept. 29, 1955  2 Sheets-Sheet 2

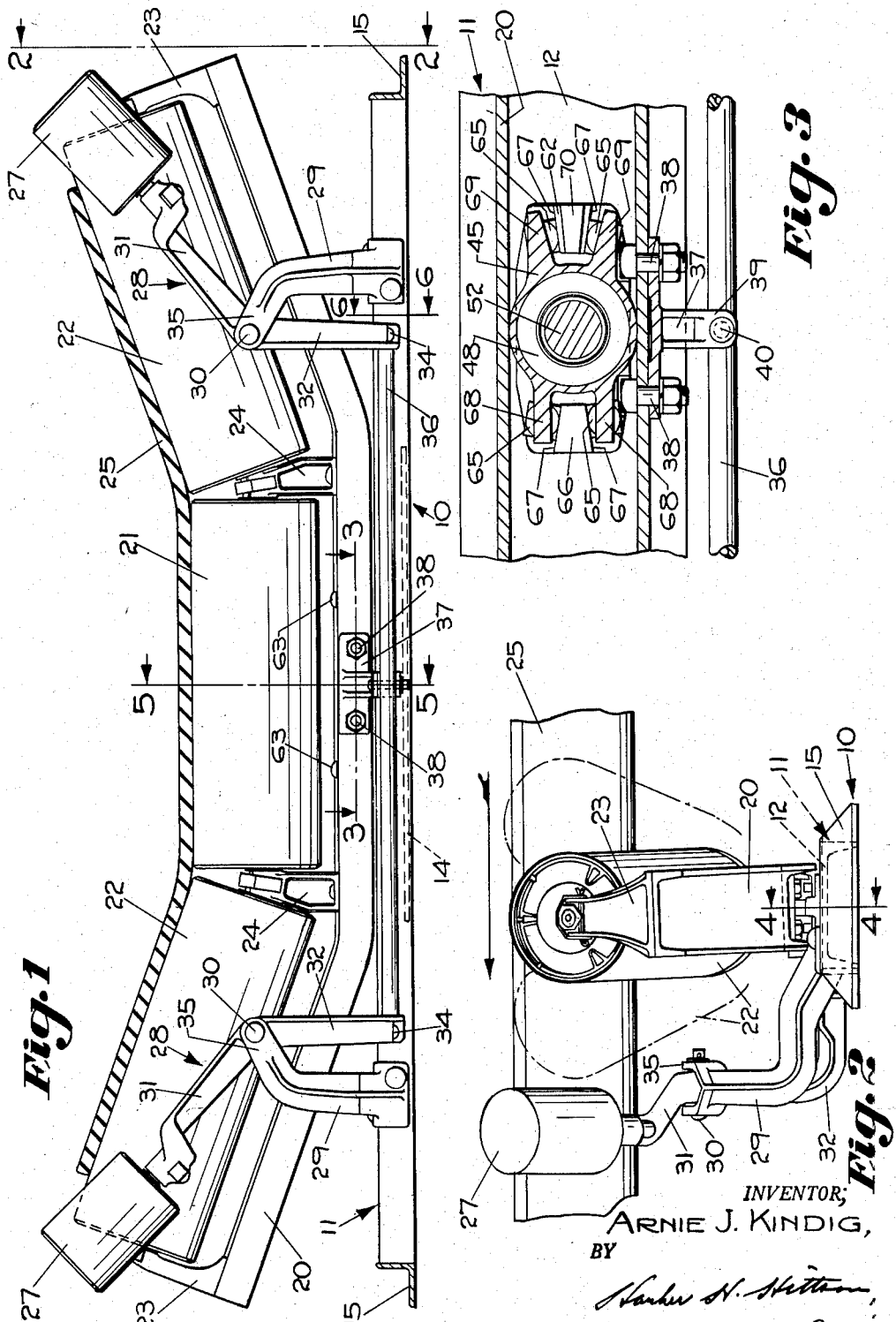

INVENTOR;
ARNIE J. KINDIG,
BY
ATT'Y.

United States Patent Office 2,869,712
Patented Jan. 20, 1959

2,869,712

CONVEYOR BELT IDLER

Arnie J. Kindig, Columbus, Ohio, assignor to The Jeffrey Manufacturing Company, a corporation of Ohio Application September 29, 1955, Serial No. 537,327

10 Claims. (Cl. 198—202)

The instant invention relates to belt training troughing idlers adapted to maintain a conveyor belt centrally aligned in its run.

It is the prime object of the instant invention to provide an improved belt training troughing idler structure including means which is engaged by the conveyor belt when the latter moves out of central alignment in its run to adjust the idler for returning the belt into alignment.

It is another object of the instant invention to provide an improved belt training troughing idler including a pair of belt troughing rolls which are upwardly and outwardly inclined in opposite directions and are mounted on a support which is forwardly inclined with respect to the path of the belt, whereby the outer ends of the rolls are advanced with respect to the inner ends thereof producing an action on the conveyor belt tending to move it to a centrally aligned position in its run and thereby having a stabilizing effect on the belt.

It is a further object of the instant invention to provide a belt training troughing idler including a support for the idler rolls which is mounted for oscillatory movement to adjust the conveyor belt when the latter gets out of alignment in its run, including a novel pivot bearing structure for mounting the support on a base.

It is also an object of the instant invention to provide a novel belt training troughing idler with a support for the idler rolls which is mounted for oscillatory movement to adjust the conveyor belt when it gets out of alignment, including a novel pivot bearing means mounting the support on a base and in which the pivot bearing assembly is a self-contained unit connecting the support to the base for oscillation of the one with respect to the other.

It is still another object of the instant invention to provide a novel pivot bearing assembly which is formed as a self-contained unit adapted to be assembled in a structure for rotatably connecting two parts thereof.

Other objects of the invention will appear hereinafter, the novel features and combinations being set forth in the appended claims.

In the drawings:

Fig. 1 is an elevational view of the novel belt training troughing idler of the instant invention;

Fig. 2 is a side view in elevation of the belt training troughing idler shown in Fig. 1 and taken on the line 2—2;

Fig. 3 is a sectional view of the pivot bearing assembly taken on the line 3—3 in Fig. 1;

Figure 4:
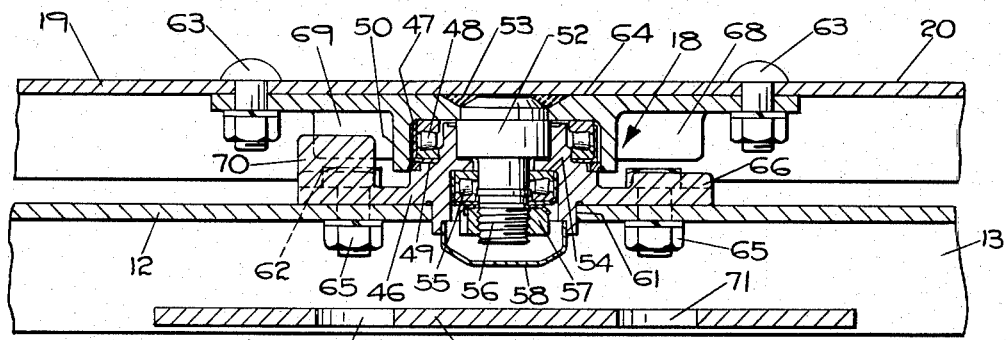
Fig. 4 is a sectional view in elevation through the support and base of the novel belt training troughing idler showing the pivot bearing assembly and taken on the line 4—4 in Fig. 2.
Figure 6:
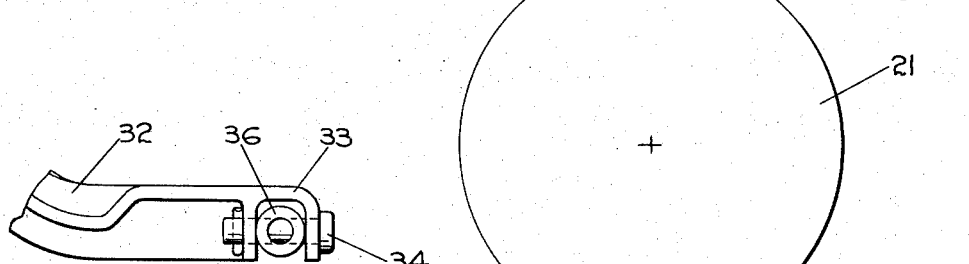
Fig. 6 is a view on the line 6—6 in Fig. 1 showing a detail of the structure.

Referring to the drawings, the instant invention in a belt training troughing idler is illustrated as embodied in a structure comprising a supporting base member 10 formed with a base channel 11 having a web 12 which supports the idler structure, and legs 13 depending from the opposite sides of the web 12. A base channel reinforcing plate 14 spans the channel legs 13 for reinforcing the supporting base structure 10. At each end of the base channel 11 there is provided a transversely extending foot angle 15, the vertical leg of which is welded or otherwise secured to the end of the base channel 11 and the horizontally extending leg of which forms a means for mounting the novel idler structure on side supporting beams.

A pivot bearing assembly 18 is mounted on the base channel web 12 in a manner to be described in greater detail below. The pivot bearing assembly 18 supports a roll supporting channel 20 which extends transversely of the run of the belt 25 and generally parallel to the base channel 11. As will appear hereinafter, the pivot bearing assembly 18 is bolted to the base channel web 12 and to the roll supporting channel 20, whereby the roll supporting channel 20 is mounted on the base channel 11 for oscillation relatively thereto.

The roll supporting channel 20 has a center portion which is horizontal, and end portions which are inclined upwardly and outwardly in opposite directions from the center portion thereof. The roll supporting channel 20 carries a center idler roller 21 and two troughing idler rolls 22. The center idler roll 21 is supported between a pair of center stands 24 bolted or otherwise secured to the web 19 of the roll supporting channel 20. The troughing idler rolls 22 are mounted one at either side of the center idler roll 21, each of the rolls 22 being mounted between a center stand 24 and an end stand 23, the latter being located one at each end of the roll supporting channel 20, and bolted or otherwise secured to the web 19 of the channel 20. It is to be understood that, in accordance with the conventional practice in the art, the idler rolls 21, 22 are supported on shafts for free rotation thereabout, engaging the underside of the conveyor belt 25 in its run and causing the conveyor belt 25 to assume a laterally troughed configuration.

The novel belt training troughing idler structure further includes a pair of side guide rolls 27 located one at either side of the idler structure. Each of the guide rolls 27 is mounted on the upper end of a guide roll supporting lever 28. Each of the guide roll supporting levers 28 is pivotally mounted intermediate its ends on a supporting post 29 extending forwardly of and upwardly from the supporting base structure 10, the posts 29 each being bolted, or otherwise secured, to the base channel 11. A pivot pin 30 mounts the guide roll supporting lever 28 in the clevis 35 on the supporting post 29 for pivotal movement thereon. Each of the guide rolls 27 includes a shaft about which the roll is freely rotatable, the shaft projecting from one end of the guide roll 27 and being received by and secured to the end of the upper leg 31 of the guide roll support lever 28. The structure of the guide roll 27 may be in accordance with idler constructions known in the art.

The lower leg 32 of the guide roll supporting lever 28 depends vertically from the pivot pin 30 and terminates in a clevis 33 adjacent the front of the base channel 11. The clevis 33 is downwardly directed and receives between its opposite faces one end of a push rod 36 which extends parallel to the supporting base structure 10. Each end of the push rod 36 is formed with an aperture for the reception of the pivot pin 34 which is inserted through the opposite sides of the clevis 33 and through the end of the push rod 36 thereby providing a pivotal connection between the ends of the lower legs 32 on the guide roll supporting levers 28 and the respective ends of the push rod 36.

Centrally located on the roll supporting channel 20 there is provided a bracket 37 secured to one leg of the channel 20 by bolts 38 or the like. The bracket 37 extend forwardly and downwardly from the roll supporting channel 20 and terminates in a forwardly facing push rod connecting clevis 39. A pivot pin 40 connects the push rod 36 to the clevis 39 forming an articulated joint at this point, the bracket 37 forming a link between the push rod 36 and the roll supporting channel 20 to transmit reciprocating motion of the push rod 36 to the roll supporting channel 20 to cause the latter to oscillate on the pivot bearing assembly 18.

As viewed in Fig. 1, the conveyor belt 25 normally is centrally located in its run on the idler rolls 21, 22. However, it may occur in the operation of the conveyor belt 25 that it will move laterally out of its centrally aligned position. In accordance with the instant invention means is provided for returning the conveyor belt 25 to its normal position centrally located with respect to the idler rolls 21, 22. Thus, assuming that the conveyor belt 25 were to shift to the right in Fig. 1, the right edge of the conveyor belt 25 would contact the periphery of the guiding roll 27 located at the right side of the idler structure, putting pressure on the guide roll 27 and oscillating the guide roll support lever 28 clockwise whereby the push rod 36 will be reciprocated to the left. The reciprocating movement of the push rod 36 to the left will be transmitted by the link 37 to the roll supporting channel 20, oscillating the same in a clockwise direction on the pivot bearing assembly 18. With the idler structure skewed in this manner, the conveyor belt 25 will be guided to the left as viewed in Fig. 1, to return it to its normal position centrally of the idler rolls 21, 22. The same action will occur in the opposite direction should be conveyor belt 25 move to the left out of its normal centrally aligned position as viewed in Fig. 1. The skew positions of the troughing idler roll 22 is illustrated in Fig. 2 in dot-dash lines.

Figure 5:
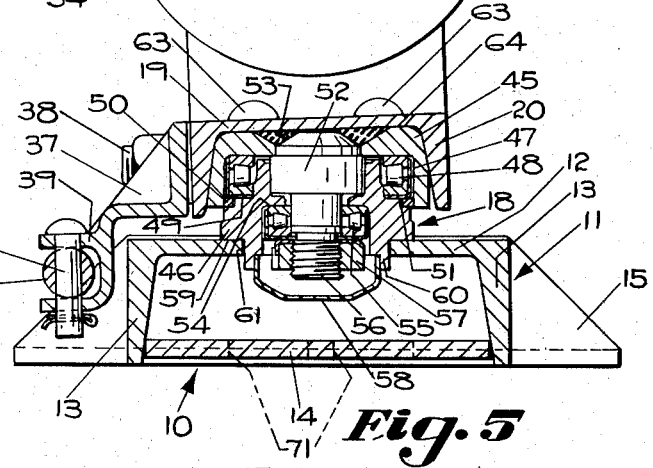
Fig. 5 is a sectional view in elevation through the novel belt training troughing idler illustrating the forward inclination of the support for the idler rolls and taken on the line 5—5 in Fig. 1.
Figure 7:
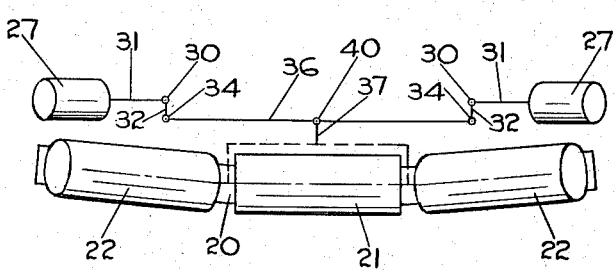
Fig. 7 is a diagrammatic plan view showing the arrangement of the idler rolls.

In order to produce a further stabilizing effect on the conveyor belt 25, the roll supporting channel 20 is inclined forwardly in the path of the conveyor belt 25, as seen in Fig. 5. For this purpose the upper surface 64 of the pivot bearing assembly 18 is sloped downwardly and forwardly with the web 19 of the roll supporting channel 20 being seated thereon. With the roll supporting channel 20 forwardly inclined, it is seen that the outer ends of the troughing idler rolls 22 are disposed in advanced position with respect to the inner ends thereof and with respect to the center idler roll 21, as illustrated in the diagrammatic view of Fig. 7. This arrangement of the troughing idler rolls 22 operates on the side margins of the conveyor belt 25 to guide the latter towards the center of the belt run, producing a stabilizing effect tending to maintain the conveyor belt centrally located in its run. It will be understood by those skilled in the art that the forwardly inclined disposition of the roll supporting channel 20 producing the aforementioned stabilizing effect on the conveyor belt 25, and the previously described adjusting structure for shifting the position of the idler rolls 21, 22 to align the conveyor belt 25, cooperate with each other to maintain the conveyor belt 25 in its normal centrally aligned position in its run.

The novel pivot bearing assembly 18 is constructed as a unitary structure which is secured to the web 12 of the base channel 11 and to the web 19 of the roll supporting channel 20, for the purpose of connecting the roll supporting channel 20 to the base channel 11 for oscillation of the roll supporting channel 20 relatively to the base channel 11. As will appear hereinafter, the pivot bearing assembly 18 is a unitary self-contained structure.

The pivot bearing assembly 18 comprises a top bearing housing 45 with an internal cylindrical receptacle 47 for housing a tapered roller bearing 48, the upper race of which bears against the top bearing housing 45. A pivot shaft 52 is secured to the top bearing housing 45, as by welding 53, and depends therefrom concentrically with the roller bearing 48. A bottom bearing housing 46 is mated with the top bearing housing 45 and includes an annular land 49 which bears against the lower race of the tapered roller bearing 48 thereby locking the bearing 48 in the pivot bearing assembly 18. A sealing piston ring 50 is also received within the cylindrical receptacle 47 of the top bearing housing 45, said piston ring being disposed in contact with the wall of the receptacle 47 immediately below the bearing 48. The bottom bearing housing 46 is provided with an annular shoulder 51 on which the piston ring 50 is seated whereby the piston ring 50 forms a dirt seal at the junction of the top and bottom bearing housings 45, 46 adjacent the tapered roller bearing 48.

The bottom bearing housing 46 is formed with a cylindrical internal receptacle 54 for a second tapered roller bearing 55 which is seated therein concentrically with the pivot shaft 52. The end of the pivot shaft 52 is formed with threads 56 for the reception of a nut 57 which is tightened against the lower race of the roller bearing 55, with the upper race thereof bearing against the surface of the receptacle 54. A sheet metal dirt sealing cup 58 is press fitted to the underside of the bottom bearing housing 46 for closing the lower end of the pivot bearing assembly 18.

From the foregoing description of the pivot bearing assembly 18 it will be apparent to those skilled in the art that the top bearing housing is rotatable with respect to the bottom bearing housing 46. In the pivot bearing assembly 18 the lower race of the bearing 48 and the upper race of the bearing 55 bear against the bottom bearing housing 46 and are stationary, while the upper race of the bearing 48 bears against the top bearing housing 45 and the lower race of the bearing 45 bears against the nut 57, whereby these races rotate with the top bearing housing 45.

The bottom bearing housing 46 is formed with a flat undersurface 59 which seats on the upper surface of the web 12 of the base channel 11. Cylindrical plug 60 depends from the flat undersurface 59 and is received within an opening 61 in the web 12 to locate the pivot bearing assembly 18 on the channel 11 and permitting the lower portion of the assembly 18 to project below the web 12 into the internal space of the base channel 11. A plurality of bolts 65 secure the bottom bearing housing 46 to the web 12 of the base channel 11. Two bolts 65 are provided on each side of the bottom bearing housing 46. On the left side of the pivot bearing housing 18, as viewed in Fig. 3, there is provided a lug 66 intermediate the bolts 65 which lug 66 presents opposite shoulders 67 one abutting the head of each of the bolts 65 to prevent the same from turning when the nut is applied to the bolt 65 and tightened thereon on the opposite side of the base channel web 12. On the right side of the pivot bearing assembly 18, as viewed in Fig. 3, there is similarly provided a lug 62 which presents opposite facing shoulders 67 abutting the heads of the bolts 65 to prevent these bolts also from turning when the nuts are tightened thereon.

The top bearing housing 45 includes a pair of depending lugs 68 on the right side thereof, as viewed in Fig. 4, which are located immediately above the heads of the bolts 65 (see Fig. 3). In assembling the top and bottom bearing housings 45, 46 to form the pivot bearing assembly 18 the bolts 65 are first placed in the bottom bearing housing 46 and when the top and bottom bearing housings 45, 46 are secured together by means of the nut 57, the bolts 65 are secured in the bottom bearing housing 46 and cannot fall out due to the proximity of the depending lugs 68 which are located immediately above the heads of the bolts 65 and leave insufficient room in which the bolts can be withdrawn from their bolt holes. Similarly on the left side of the top bearing housing 45, as viewed in Fig. 4, there are provided a pair of depending lugs 69 located immediately above the bolts 65 on the left side of the pivot bearing assembly 18 to prevent removal of the bolts 65 from the pivot bearing assembly in the same manner as above described.

The depending lugs 69 also cooperate with an upstanding post 70 which rises from the lug 62. The lugs 69 form a pair of arms between which the top of the upstanding post 70 is disposed so that when the top bearing housing 45 is rotated relatively to the bottom bearing housing 46 in either direction, the arms 69 will abut the posts 70, and thereby form means defining the limits of an arc within which the roll supporting channel 20 can oscillate. The included angle between the arms 69 is of the order of 20°, whereby the arc through which the roll supporting channel 20 oscillates is similarly of the order of 20°, this degree of movement having been found sufficient to maintain the conveyor belt 25 in proper alignment with the idler rolls 21, 22.

The web 19 of the roll supporting channel 20 is seated on the upper surface 64 of the top bearing housing 45 with a plurality of bolts 63 securing the roll supporting channel 20 to the top bearing housing 45. The pivot bearing assembly 18 is a self-contained unit which is readily assembled with the roll supporting channel 20 and the base channel 11 merely by means of the bolts 63, 65 respectively. The base channel reinforcing plate 14 spanning the legs 13 of the base channel 11 underlies the pivot bearing assembly 18 and is provided with a plurality of access holes 71 aligned with the bolts 65 permitting the insertion of a tool for the purpose of tightening the nuts on the bolts 65. It will be understood that access need not be had to the heads of the bolts 65 during the tightening operation for the reason that the shoulders 67 abut the heads of the bolts 65 to prevent rotation thereof.

It will be apparent to those skilled in the art that the instant invention provides an improved belt training troughing idler for an endless conveyor belt adapted to carry and move materials, wherein the idler is mounted for oscillation about a vertical axis, and there is provided means for adjusting the position of the idler on the axis should the conveyor belt move laterally out of its normal run centrally of the idler, to return the belt to its normal run. As a further feature of the invention the idler includes a pair of troughing rolls on axes inclined upwardly and outwardly from the center of the belt run, the rolls being mounted on a support which is inclined forwardly in the path of the belt whereby the outer ends of the troughing rolls are advanced with respect to the inner ends thereof, acting to maintain the conveyor belt centered in its normal run and producing a stabilizing effect on the belt. The novel pivot bearing assembly of the invention forms a unitary structure mounting the idler roll support on a base for oscillation with respect thereto, permitting angular adjustment of the idler rolls to position the conveyor belt in its normal run as aforementioned. The improved construction of the pivot bearing assembly permits the unit to be readily replaced in the idler structure with facility simply upon removal of several bolts.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A training troughing idler for a conveyor belt comprising a support extending transversely of the belt, idler roll means on the support engaging the underside of the belt to maintain it in a normal run centrally disposed with respect to the idler, said support being mounted on a base for oscillatory movement about a vertical axis, belt guiding rolls supported on the base and disposed one adjacent each edge of the belt, each of the guiding rolls being positioned beyond the normal run of the belt whereby the belt is adapted to engage one or the other of the guiding rolls only when it moves to a position laterally of said normal run, each of the guiding rolls being mounted on a pivoted lever, the ends of said levers being pivotally connected to the ends of a push rod, said push rod being linked to the support for adjustment thereof and the idler roll means under control of the guiding rolls to center the belt on the idler in said normal run.

2. A training troughing idler for a conveyor belt comprising, a support extending transversely of the belt, idler roll means on the support engaging the underside of the belt to maintain it in a normal run centrally disposed with respect to the idler, said support being mounted on a base for oscillatory movement about a vertical axis, belt guiding rolls supported on the base and disposed one adjacent each edge of the belt, each of the guiding rolls being positioned beyond the normal run of the belt whereby the belt is adapted to engage one or the other of the guiding rolls only when it moves to a position laterally of said normal run, each of the guiding rolls being mounted on a pivoted lever, the ends of said levers being pivotally connected to the ends of a push rod, said push rod extending transversely of the belt, a link rigidly connected to the support extending therefrom towards the push rod, pivot means connecting the link to the push rod, reciprocation of the push rod by the pivoted levers oscillating the support for adjustment thereof and the idler roll means under control of the guiding rolls to center the belt on the idler in said normal run.

3. A training troughing idler for a conveyor belt comprising, a support extending transversely of the belt, idler roll means on the support engaging the underside of the belt to maintain it in a normal run centrally disposed with respect to the idler, said support being mounted on a base for oscillatory movement about a vertical axis, belt guiding rolls supported on the base and disposed one adjacent each edge of the belt, each of the guiding rolls being positioned at the sides of the belt beyond the normal run thereof whereby the belt is adapted to engage one or the other of the guiding rolls only when it moves to a position laterally of said normal run, a pair of levers mounted on the base one at each side of the idler and each pivoted intermediate its length on a horizontal axis, one end of each of said levers mounting a guide roll and the opposite ends of said levers being pivotally connected to the ends of a push rod, said push rod extending transversely of the belt, a link rigidly connected to the support extending therefrom towards the push rod, pivot means connecting the link to the push rod, reciprocation of the push rod by the pivoted levers oscillating the support for adjustment thereof and the idler roll means under control of the guiding rolls to center the belt on the idler in said normal run.

4. A training troughing idler for a conveyor belt comprising, a support extending transversely of the belt, idler roll means on the support engaging the underside of the belt to maintain it in a normal run centrally disposed with respect to the idler, said idler roll means comprising a pair of troughing rolls located one at each side of the idler on axes oppositely inclined upwardly and outwardly of the idler, said support being mounted on a base for oscillatory movement about a vertical axis, belt guiding rolls supported on the base and disposed one adjacent each edge of the belt, each of said guiding rolls being positioned beyond the normal run of the belt whereby the belt is adapted to engage one or the other of the guiding rolls only when it moves to a position laterally of said normal run, each of the guiding rolls being mounted on a pivoted lever, the ends of said levers being pivotally connected to the ends of a push rod, said push rod being linked to the support for adjustment thereof and the idler roll means under control of the guiding rolls to center the belt on the idler in said normal run, said support being inclined forwardly whereby the outer ends of the troughing rolls are advanced with respect to the inner ends thereof acting to center the belt on the idler and stabilizing the run thereof.

5. A training troughing idler for a conveyor belt comprising, a support extending transversely of the belt, idler roll means on the support engaging the underside of the belt to maintain it in a normal run centrally disposed with respect to the idler, said support being mounted on a base for oscillatory movement about a vertical axis, a pivot bearing assembly mounting the support on the base including a top bearing housing connected to the support, a bottom bearing housing connected to the base, bearing means intermediate the top and bottom bearing housings, a pivot shaft connecting the top and bottom bearing housings for rotation of one relatively to the other, belt guiding rolls supported on the base and disposed adjacent the edges of the belt, each of the guiding rolls being positioned beyond the normal run of the belt whereby the belt is adapted to engage one or the other of the guiding rollers only when it moves to a position laterally of said normal run, each of the guiding rolls being mounted on a pivoted lever, the ends of said levers being pivotally connected to the ends of a push rod, said push rod being linked to the support for adjustment thereof and the idler roll means under control of the guiding rolls to center the belt on the idler in said normal run.

6. A pivot bearing assembly for rotatably mounting a support member on a base member for rotation of one of said members relatively to the other comprising, a top bearing housing, a bottom bearing housing, bearing means interposed between said top and bottom bearing housings, a pivot shaft on the top bearing housing depending therefrom securing said bearing housings in assembled relation, the top bearing housing being adapted to be secured to the support member, and the bottom bearing housing being adapted to be secured to the base member, the bottom bearing housing including webs at either side thereof provided with holes for the reception of bolt means for securing the bottom bearing housing to the base member, the top bearing housing including a plurality of shoulders overlying the bolt holes in the bottom bearing housing and extending in the direction of said bolt holes, the shoulders preventing removal of bolts from said bolt holes when the top and bottom bearing housings are secured one to the other in assembled relation.

7. A pivot bearing assembly for rotatably mounting a support member on a base member for rotation of one of said members relatively to the other comprising, a top bearing housing, a bottom bearing housing, bearing means interposed between said top and bottom bearing housings, a pivot shaft on the top bearing housing depending therefrom securing said bearing housings in assembled relation, the top bearing housing being adapted to be secured to the support member, and the bottom bearing housing being adapted to be secured to the base member, the bottom bearing housing including webs at either side thereof provided with holes for the reception of bolt means for securing the bottom bearing housing to the base member, the top bearing housing including a plurality of shoulders overlying the bolt holes in the bottom bearing housing and extending in the direction of said bolt holes, the shoulders preventing removal of bolts from said bolt holes when the top and bottom bearing housings are secured one to the other in assembled relation, the webs on the bottom bearing housing including a plurality of shoulders located one adjacent each bolt hole abutting the head of a bolt inserted therein and preventing rotation of the bolt when a nut is threaded thereon.

8. A training troughing idler for a conveyor belt comprising, a support extending transversely of the belt, idler roll means on the support engaging the underside of the belt to maintain it in a normal run centrally disposed with respect to the idler, said idler roll means comprising a pair of troughing rollers located one at each side of the idler on axes oppositely inclined upwardly and outwardly of the idler, said support being mounted on a base for oscillatory movement about a vertical axis, a pivot bearing assembly disposed intermediate the support and the base comprising a top bearing housing, a pivot shaft depending from the top bearing housing, a bottom bearing housing, bearing means intermediate the top and bottom bearing housings, said pivot shaft securing the bottom bearing housing to the top bearing housing for rotation of one of said housings with respect to the other of said housings, the top bearing housing being secured to the support and the bottom bearing housing being secured to the base, belt guiding rolls disposed one adjacent each edge of the belt, each of said guiding rolls being positioned beyond the normal run of the belt whereby the belt is adapted to engage one or the other of the guiding rolls only when it moves to a position laterally of said normal run, each of the guiding rolls being mounted on a pivoted lever, the ends of said levers being pivotally connected to the ends of a push rod, said push rod being linked to the support for adjustment thereof and the idler roll means under control of the guiding rolls to center the belt on the idler in said normal run, the top bearing housing having an upwardly facing surface on which the support is mounted, said upwardly facing surface being sloped forwardly to mount the support with a forward inclination whereby the outer ends of the troughing rolls are advanced with respect to the inner ends thereof acting to center the belt on the idler and stabilizing the run thereof.

9. A training troughing idler for a conveyor belt comprising a support extending transversely of the belt, idler roll means on the support engaging the underside of the belt to maintain it in a normal run centrally disposed with respect to the idler, said idler roll means comprising a pair of troughing rolls located one at each side of the idler on axes oppositely inclined upwardly and outwardly of the idler, said support being mounted on a base for oscillatory movement about a vertical axis, a pivot bearing assembly intermediate the support and the base having a top bearing housing secured to the support and a bottom bearing housing secured to the base, bearing means intermediate the top and bottom bearing housings, means rotatably securing the top and bottom bearing housings in the pivot bearing assembly, belt guiding rolls disposed one adjacent each edge of the belt, each of said guiding rolls being positioned beyond the normal run of the belt whereby the belt is adapted to engage one or the other of the guiding rolls only when it moves to a position laterally of said normal run, means for adjusting the support and the idler roll means under control of the guiding rolls to center the belt on the idler in said normal run, the top bearing housing including a surface on which the support is mounted, said surface being sloped forwardly mounting the support thereon with a forward inclination whereby the outer ends of the troughing rolls are advanced with respect to the inner ends thereof acting to center the belt on the idler and stabilizing the run thereof.

10. A training troughing idler for a conveyor belt comprising a support extending transversely of the belt, idler roll means on the support engaging the underside of the belt to maintain it in a normal run centrally disposed with respect to the idler, said idler roll means comprising a pair of troughing rolls located one at each side of the idler on axes oppositely inclined upwardly and outwardly of the idler, said support being mounted on a base for oscillatory movement about a vertical axis, a pivot bearing assembly intermediate the support and the base, said assembly having a bottom bearing housing secured to the base and a top bearing housing secured to the support, bearing means intermediate the top and bottom bearing housings, means rotatably securing the top and bottom bearing housings to each other for rotation of the top bearing housing relatively to the bottom bearing housing, the support being thereby mounted on the vertical axis for angular adjustment thereof and the idler roll means to center the belt on the idler in said normal run, the top bearing housing having an upwardly facing surface on which the support is mounted, said upwardly facing surface being sloped forwardly mounting the support thereon with a forward inclination whereby the outer ends of the troughing rolls are advanced with respect to the inner ends thereof acting to center the belt on the idler and stabilizing the run thereof.

References Cited in the file of this patent

UNITED STATES PATENTS

| | | |
|---|---|---|
| 1,446,270 | Pfeiffer | Feb. 20, 1923 |
| 1,486,259 | Nelson | Mar. 11, 1924 |
| 2,109,923 | Lemmon | Mar. 1, 1938 |
| 2,160,057 | Carus et al. | May 30, 1939 |
| 2,399,913 | Dodge | May 7, 1946 |
| 2,569,419 | Kendall | Sept. 25, 1951 |

FOREIGN PATENTS

| | | |
|---|---|---|
| 15,714 | Norway | Nov. 5, 1906 |
| 1,064,740 | France | Dec. 30, 1953 |